May 21, 1963 G. M. PORTER 3,090,269
ADJUSTABLE ANGLE TRAVELLING SAW
Filed Dec. 21, 1959 3 Sheets-Sheet 1

FIG. I.

*INVENTOR.*
GLENN M. PORTER

BY *Herbert E. Kjader*

AGENT.

May 21, 1963 G. M. PORTER 3,090,269
ADJUSTABLE ANGLE TRAVELLING SAW
Filed Dec. 21, 1959 3 Sheets-Sheet 2

*INVENTOR.*
GLENN M. PORTER

BY Herbert E. Kidder

AGENT.

May 21, 1963  G. M. PORTER  3,090,269
ADJUSTABLE ANGLE TRAVELLING SAW
Filed Dec. 21, 1959  3 Sheets-Sheet 3

INVENTOR.
GLENN M. PORTER

BY *Herbert E. Fidder*

AGENT.

United States Patent Office 3,090,269
Patented May 21, 1963

3,090,269
ADJUSTABLE ANGLE TRAVELLING SAW
Glenn M. Porter, Riverside, Calif., assignor to National Distillers and Chemical Corporation, a corporation of Virginia
Filed Dec. 21, 1959, Ser. No. 860,913
1 Claim. (Cl. 83—473)

The present invention relates to cut-off saws for cutting metal panels and structural members to length in making awnings and the like, and the primary object of the invention is to make a saw which is capable of cutting a part to any measured length, as indicated by a scale on the saw fence, regardless of the angle of cut.

Heretofore, metal saws of the type referred to have comprised a radial arm mounted on the top end of a vertical post, and slidably supported on a track on the radial arm is a motorized saw. The radial arm is swung on the post to any desired angle with respect to a fence on the saw table for making angle cuts. The chief disadvantage of such prior saws is that the post is mounted at some distance behind the fence, and therefore, as the radial arm is swung around to different angled positions, the path of the saw blade passes through the fence at different positions along the length of the latter. This makes it impossible to incorporate a graduated scale in the fence so that work pieces may be laid out along such scale and cut to length, as the scale would measure the true length of the cut part only for a right angle cut. Since many awning parts are cut off at varying angles, it would be impossible to use such prior cut-off saws for cutting awning panels and members to length without first measuring and marking each individual part so as to show a line to which the saw can be made to cut. This is an inconvenient and time wasting procedure which is completely eliminated in the present invention.

In the present invention, the saw is carried on a track which is pivotally supported so that for any angle of cut, the saw blade always passes through a fixed point on the table substantially at the front edge of the fence and at the zero point on the graduated scale mounted thereon. Thus, all that is required to cut a piece to length with an angled cut-off, is to swing the track around to the desired angle, lay the piece out along the fence and with one end of the scale graduation for the desired length, and pull the saw through the piece. Marking and measuring of each individual piece to be cut is eliminated, and the work of cutting awning panels and structural member is greatly facilitated.

Figure 1:
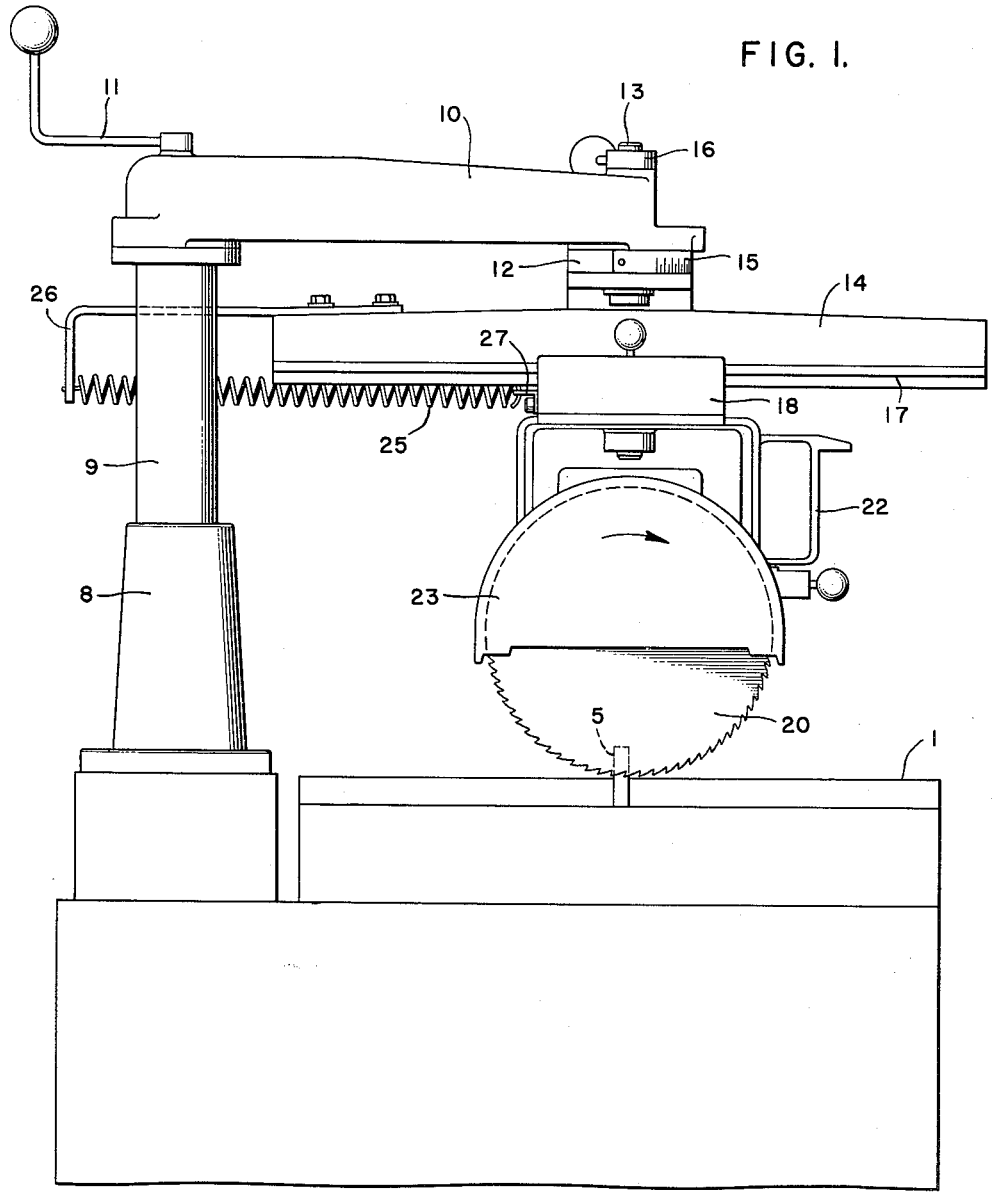
FIGURE 1 is a side elevational view of a cut-off saw embodying the principles of the invention.
Figure 2:
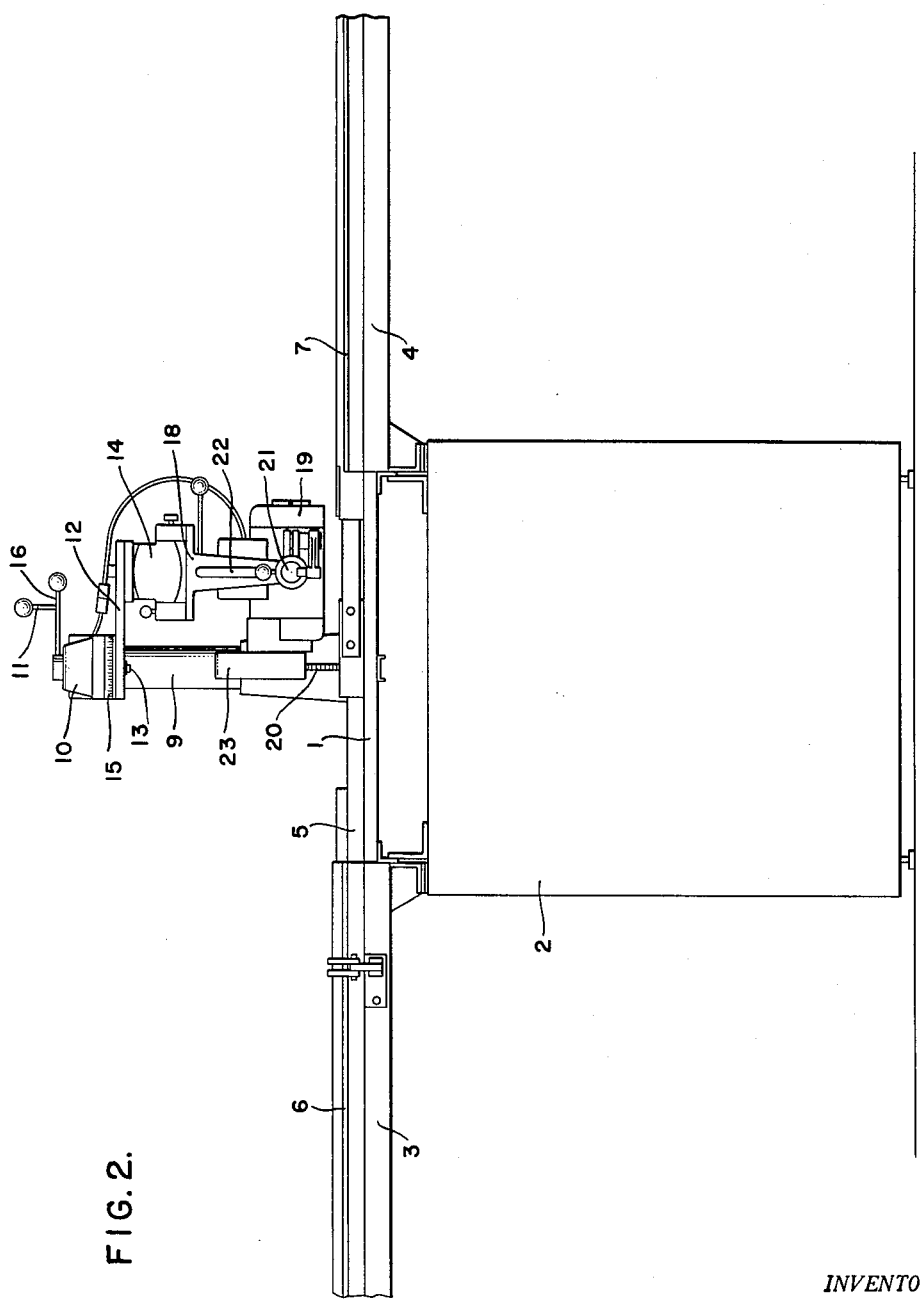
FIGURE 2 is a front elevational view of the same.
Figure 3:
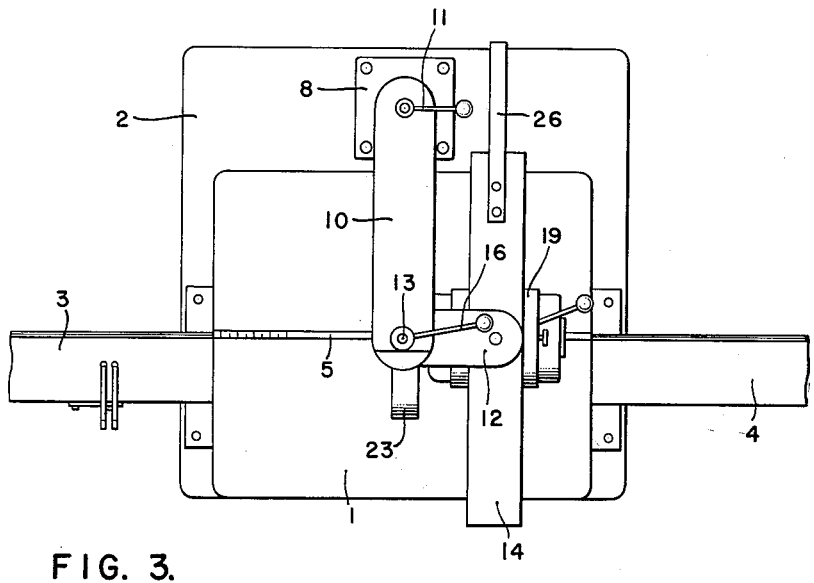
FIGURE 3 is a top plan view.

The cut-off saw of the invention includes a table 1 mounted on a supporting stand 2 and having side extensions 3 and 4 projecting laterally from opposite sides from the table. A fence 5 extends transversely across the table 1 and out along the length of each of the side extensions 3 and 4. Mounted on the side of the left hand fence facing the operator is a measuring tape 6, while a second measuring tape 7 is attached to the face of the right hand fence. Both of the measuring tapes 6 and 7 are graduated in units of length, with the zero point located at the center of the saw blade.

Bolted to the stand 2 behind the table 1 is a column base 8, which holds a vertical post 9. Mounted on the top end of the post 9 and projecting forwardly therefrom over the table 1 is a radial arm 10. The post 9 and arm 10 can be raised and lowered with respect to the table by means of a crank 11, which operates an elevating screw within the post.

Pivotally mounted on the underside of the arm 10 at the outer end thereof is a plate 12 which is swiveled for turning movement about a pivot bolt 13. The centerline, or axis, of the pivot bolt 13 passes through the said zero point on the table, directly in front of the fence 5. The plate 12 projects to the right-hand side of the arm 10, and mounted on its outer end is a track supporting member 14. The track supporting member 14 normally extends parallel to the arm 10 for making right angle cuts, but can be swung to any desired angle, as measured by a miter scale 15, which is attached to the plate 12. A locking lever 16 on the outer end of the radial arm 10 clamps the track member 14 in angularly adjusted position.

The track member 14 is supported intermediate its ends from the member 12, and slidably mounted on tracks 17 extending along opposite sides of the member 14 adjacent the bottom thereof is a carriage 18 carrying the motor 19 and circular saw blade 20. The motor 19 is supported on the carriage 18 by trunnions 21, which allow the saw blade 20 to be tilted for making chamfered cuts. A handle 22 on the carriage enables the operator to draw the saw through the work. The saw blade 20 is covered by the usual guard 23 to protect the operator from flying chips.

The saw is returned to its normal position of rest at the rear end of the track member 14 by means of a spring 25, one end of which is attached to a bracket 26 extending rearwardly from the track member 14. The other end of the spring 25 is connected to another bracket 27 on the back side of the carriage 19. The saw is normally held at the rear end of the track member 14 by the spring 25, and is pulled forwardly through the work by the operator, using the handle 22.

Figure 4:
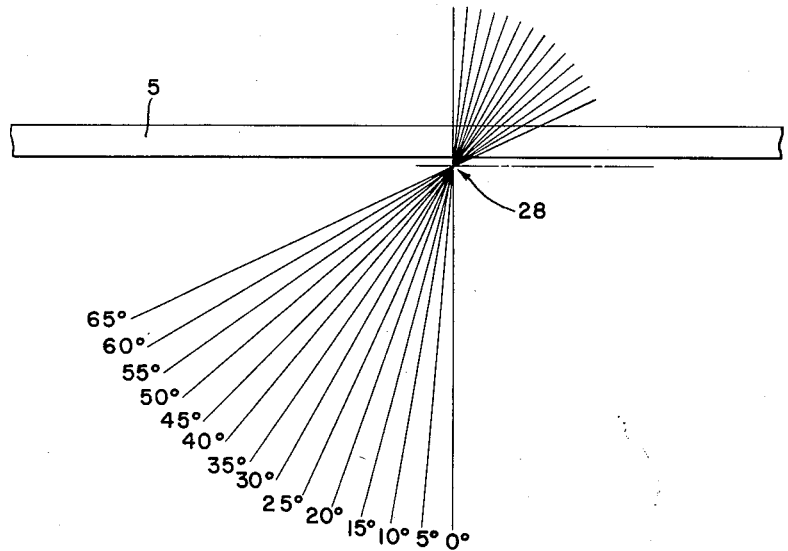
FIGURE 4 is a schematic view, looking down onto the table, and showing the path of the saw blade for varying angles of cut.

As best shown in FIGURE 4, the path of the saw blade 22 passes through a fixed point 28 for all angular positions of the track member 14. It will be noted that the intersection point 28 lies immediately adjacent the front side of the fence 5, and at a point corresponding to the zero graduation on the two measuring tapes 6 and 7. An awning panel or structural member to be cut is placed on one or the other of the two side extensions 3 or 4, depending upon whether the piece is to be cut off at the right hand end or left hand end thereof. The work piece is placed against the fence 5 with its outer end located at the graduation on the scale 6 or 7 corresponding to the length dimension to which the piece is to be cut. The track member 14 is then swung around to the desired angle, locked, and the saw pulled through the work piece.

I claim:

A cut-off saw comprising a table having side extensions projecting laterally from opposite sides thereof, a fence extending across the back of said table and extending out along the length of each of said extensions, a pair of oppositely extending graduated scales mounted on said fence, each of said scales starting from a common zero point located adjacent the center of said table and in the vertical plane of said fence, a vertical post mounted to the rear of said table, a radial arm fixed to the top end of said post and extending forwardly over said table, a flat horizontal plate pivoted on the outer end of said radial arm for swinging movement about a vertical axis directly above and in alignment with said zero point, said plate extending laterally to one side of said axis, a supporting track fixedly mounted on the laterally extended end of said plate, a carriage slidably mounted on said track, a motor driven saw mounted on the underside of said carriage, the blade of said saw being offset laterally with respect to said carriage whereby when a work piece is placed against the fence in a selected position the blade of said saw will pass through the zero point for all angular positions of said plate when said carriage is slidably moved along said track.

References Cited in the file of this patent

UNITED STATES PATENTS

| | | |
|---|---|---|
| 1,046,613 | Leger | Dec. 10, 1912 |
| 1,601,610 | Carter | Sept. 23, 1926 |
| 2,207,370 | Bayley | July 9, 1940 |
| 2,559,283 | Dick | July 3, 1951 |
| 2,722,952 | Snyder | Nov. 8, 1955 |

FOREIGN PATENTS

| | | |
|---|---|---|
| 503,743 | Great Britain | Apr. 13, 1939 |
| 268,234 | Switzerland | May 15, 1950 |